(12) United States Patent
Steffen et al.

(10) Patent No.: US 11,012,367 B2
(45) Date of Patent: May 18, 2021

(54) TECHNOLOGIES FOR MANAGING TCP/IP PACKET DELIVERY

(71) Applicant: Intel IP Corporation, Santa Clara, CA (US)

(72) Inventors: Juergen Steffen, Nuremberg (DE); Ahmed Soud Salem, Ottobrunn (DE); Hans Leicht, Unterleinleiter (DE); Marcus Mertens, Nuremberg (DE); Mohamed Khalil, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 40 days.

(21) Appl. No.: 15/941,428

(22) Filed: Mar. 30, 2018

(65) Prior Publication Data

US 2019/0044878 A1 Feb. 7, 2019

(51) Int. Cl.
*H04L 12/863* (2013.01)
*H04L 12/801* (2013.01)

(52) U.S. Cl.
CPC ............ *H04L 47/622* (2013.01); *H04L 47/34* (2013.01)

(58) Field of Classification Search
CPC ................... H04L 47/622; H04L 47/34; H04L 2012/5681
USPC ......................................................... 370/412
See application file for complete search history.

(56) References Cited

U.S. PATENT DOCUMENTS

| 2008/0056273 | A1* | 3/2008 | Pelletier | H04L 69/22 370/395.21 |
| 2010/0312941 | A1* | 12/2010 | Aloni | H04L 49/90 710/310 |
| 2015/0296418 | A1* | 10/2015 | Szilagyi | H04L 69/161 370/331 |
| 2016/0080272 | A1* | 3/2016 | McNaughton | H04L 41/147 370/230.1 |
| 2017/0187629 | A1* | 6/2017 | Shalev | H04L 69/10 |
| 2020/0100324 | A1* | 3/2020 | Wittberg | H04L 47/283 |

OTHER PUBLICATIONS

IEEE: Title—Active Queue Management with Dual Virtual Proportional Integral Queues for TCP Uplink/Downlink Fairness in Infrastructure WLANs. Qiuyan Xia, Student Member, IEEE, Xing Jin, Student Member, IEEE, and Mounir Hamdi, Senior Member, IEEE. Year Published: 2008. (Year: 2008).*

* cited by examiner

*Primary Examiner* — Hassan A Phillips
*Assistant Examiner* — Mohammed S Chowdhury
(74) *Attorney, Agent, or Firm* — Hanley, Flight & Zimmerman, LLC

(57) ABSTRACT

Technologies for managing Transmission Control Protocol/Internet Protocol (TCP/IP) packet delivery include a network interface controller (NIC) of a computing device. The NIC is configured to retrieve identifying data from received IP packets and identify a TCP data stream associated with each received IP packet based on the retrieved identifying data. Additionally, the NIC is configured to determine a service data flow queue associated with the TCP data stream, determine whether a plurality of IP packets presently enqueued in the determined service data flow queue are out of order, and enqueue the received IP packet at a tail of the identified service data flow queue if the NIC determines that the plurality of IP packets presently enqueued in the determined service data flow queue are out of order. Other embodiments are described herein.

21 Claims, 7 Drawing Sheets

TECHNOLOGIES FOR MANAGING TCP/IP PACKET DELIVERY

BACKGROUND

Due to its simplicity, reliability, and adapting its transmission rate to end-to-end delays and packet losses caused by congestion, Transmission Control Protocol/Internet Protocol (TCP/IP) has become the de-facto standard over wired networks. For example, TCP is widely used in various popular applications, such as Telnet, file transfer protocol (FTP), hypertext transfer protocol (HTTP), etc. Due to its broad use, TCP has been tuned for wired networks where the error rates are relatively low (i.e., compared to that of wireless networks) and packet loss is generally attributable to congestion in the networks. In other words, in wired networks, random bit error rate is negligible. However, when a TCP sender transmits packets over wireless communication channels characterized by high bit error rates (e.g., resulting from the mobility of wirelessly connected device's where link quality and bandwidth can rapidly change, unstable communication channel characteristics, collisions, noise, etc.), TCP performance can be perceptively degraded. This is primarily a result of TCP's inability to distinguish the root cause of packet loss (e.g., network congestion vs. transmission errors).

As such, error recovery technologies have been developed to minimize the effect of utilizing wireless communication channels. For example, 3GPP employs forward error correction (FEC) coding and Automatic Repeat reQuest (ARQ) mechanisms as error recovery schemes in Layer 2 of wireless networks, while others rely on TCP retransmission schemes. However, such wireless communication channels typically carry more than one service data flow at a time. For example, the channel may carry one or more of an IP flow, a TCP stream, a UDP stream, etc. It should be appreciated that some high-capacity wireless links (e.g., 4G and 5G cellular networks) may carry tens of simultaneous service data flows, which can all be affected when a wireless link is in an error recovery condition. Additionally, in packet loss scenarios in which a TCP retransmission scheme is employed, an amount of TCP data may already be queued, which can take up to several seconds until the retransmitted TCP packet can be handed and transmitted wirelessly (i.e., the TCP retransmissions reach the intended recipient only after all the previously transmitted new TCP data packets).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
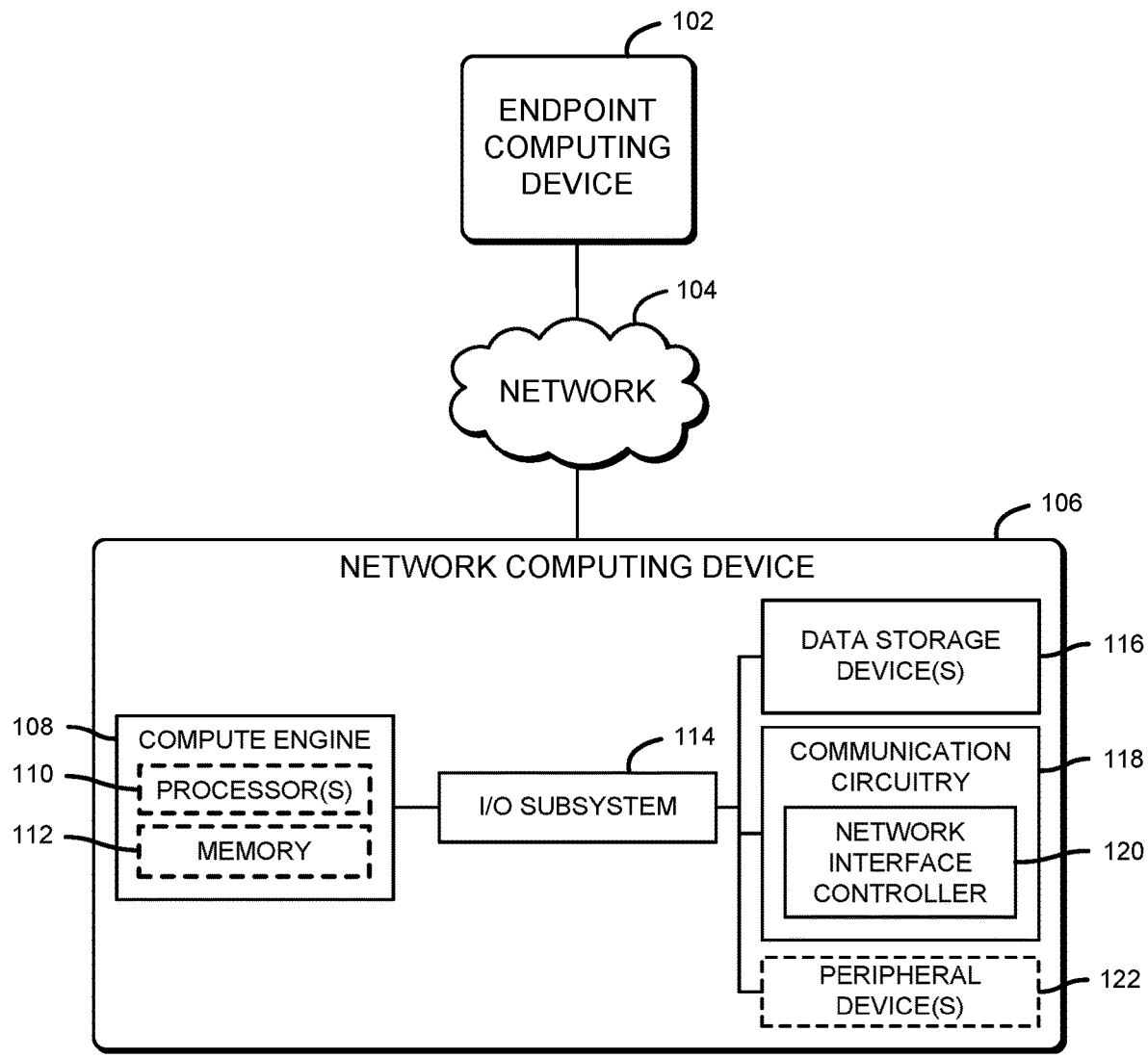
FIG. 1 is a simplified block diagram of at least one embodiment of a system for managing Transmission Control Protocol/Internet Protocol (TCP/IP) packet delivery that includes an endpoint computing device communicatively coupled to a network computing device via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing Transmission Control Protocol/Internet Protocol (TCP/IP) packet delivery includes a network computing device 106 communicatively coupled to an endpoint computing device 102 via a network 104. In use, the network computing device 106 transmits and receives network traffic (e.g., network packets, frames, etc.) to/from another computing device (e.g., the endpoint computing device 102). For example, upon receipt of a network packet, the network computing device 106 undertakes some action as a result of having received the network packet and/or forwards the network packet to a subsequent target computing device, typically after undertaking some level of processing on at least a portion of the received network packet (e.g., at least a portion of the header, the payload, etc.). Oftentimes, such computing devices rely on TCP/IP communication protocols to transmit the network packets.

For example, the network computing device 106 is configured to transmit network packets using the TCP protocol to establish virtual connections between the network computing device 106 and another computing device (e.g., the endpoint computing device 102), and deliver the network packets across a physical IP protocol network (e.g., the network 104). Under certain conditions, packets may be lost, delayed, or otherwise unable to reach their destination. To address this problem, various error recovery technologies have been developed. For example, Automatic Repeat reQuest (ARQ) mechanisms are used as an error recovery scheme in Layer 2 of wireless networks. However, some network packets may be received out of order (i.e., out of sequential order), which can result in those out of order network packets not being delivered to upper layers.

For example, present technologies typically only process downlink IP packets when the ARQ function is in order (i.e., in sequential order). Accordingly, the network computing device 106, or more particularly a traffic flow manager (see, e.g., the traffic flow manager 212 of FIG. 2) of the network computing device 106, is configured to reside between the ARQ L2 layer and the IP stack at the host side such that the traffic flow manager can receive all complete re-assembled raw (i.e., non-encrypted) IP packets irrespective of whether being received in order or out of order by an ARQ entity, and deliver only those IP packets of the in order queues to the next level layer (e.g., the IP stack at the host side). In other words, the traffic flow manager is generally configured to delay delivery of IP packet from the out of order queues and transmit the IP packets from the in order queues without waiting until an out of order ARQ link is returned to an in order state.

Additionally, certain types of network packets (e.g., packet data convergence protocol (PDCP) interspersed feedback packets to a Robust Header Compression (RoHC) compressor) can be delivered out of order without delay and without introducing potential complications. As such, the traffic flow manager is additionally configured to identify those IP packets which can be delivered out of order and deliver them to the next level layer regardless of whether those packets are in order or out of order. It should be appreciated that, while the computing device sending TCP data packets generally does so in a manner to allow continuous transmission, the amount of TCP data packets that have been transmitted but not yet acknowledged is typically limited to prevent or minimize queueing and congestion. If TCP packet loss occurs, the transmitting computing device may be configured to schedule TCP retransmissions. However, because TCP data is typically queued at the time of receipt, it can take up to several seconds for the retransmitted TCP packet to be handled and transmitted, which can result in TCP retransmission timeouts and a drop in throughput.

Accordingly, to address such deficiencies, the network computing device 106, or more particularly the traffic flow manager of the network computing device 106, is configured to detect and prioritize the retransmitted TCP data packets. To do so, the traffic flow manager is configured to identify which IP packets belong to which services (e.g., TCP/IP streams) and place the related IP packets in queues in accordance with their respective identified services. As such, the traffic flow manager can identify which IP packets are retransmitted TCP data packets. Additionally, the traffic flow manager is configured to place the IP packets identified as being retransmitted TCP data packets at a head of the queue, rather than the tail of the queue, as is done presently. As such, round trip time (RTT) of the retransmitted IP packet can be reduced.

Under certain conditions, a burst of TCP acknowledgment (ACK) packets may be queued in the uplink direction for a particular TCP stream. As such, the host sided TCP stack will typically generate TCP ACK packets in the same burst behavior as the TCP data packets arrive. However, such bursts can acknowledge more TCP data than is necessary. Accordingly, unlike present technologies which transmit the TCP ACK packets in uplink as quickly as possible (i.e., maintaining the bursty behavior), the network computing device 106, or more particularly the traffic flow manager, is configured to not send more TCP ACK packets than is determined to be necessary.

To do so, the traffic flow manager is configured to determine a TCP download throughput per TCP stream, which is averaged in time, and can be used to limit the number of TCP ACK packets which are extracted for transmission from each queue. In other words, TCP throughput values are averaged in time and control how many TCP ACK packets are sent in time to acknowledge a given amount TCP data bytes which are needed to be acknowledged to keep the present throughput stable. It should be appreciated that the traffic flow manager is configured to do so independently per TCP download stream.

The network computing device 106 may be embodied as any type of computation or computer device capable of performing the functions described herein, including, without limitation, a computer, a modem, a server (e.g., standalone, rack-mounted, blade, etc.), a sled (e.g., a compute sled, an accelerator sled, a storage sled, a memory sled, etc.), an enhanced network interface controller (NIC) (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system. It should be appreciated that, depending on the embodiment in which the network computing device 106 is deployed and the intended application for which the network computing device 106 has been deployed, the network computing device 106 may be deployed in a data center, in an HPC environment, at an edge of a device network (e.g., a gateway edge node or edge communication node in a multi-access edge computing (MEC) network), at an edge of an enterprise network (e.g., a fog node in a fog network), or other network architecture.

As shown in FIG. 1, the illustrative network computing device 106 includes a compute engine 108, an I/O subsystem 114, one or more data storage devices 116, communication circuitry 118, and, in some embodiments, one or more peripheral devices 122. It should be appreciated that the network computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as a single-core processor, a multi-core processor, a digital signal processor, a microcontroller, or other processor or processing/controlling circuit. In some embodiments, the processor(s) 110 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 112 may be embodied as any type of volatile (e.g., dynamic random access memory (DRAM), etc.) or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the network computing device 106 via the I/O subsystem 114, which may be embodied as circuitry and/or components to facilitate input/output operations with the processor 110, the memory 112, and other components of the network computing device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a system-on-a-chip (SoC) and be incorporated, along with one or more of the processor 110, the memory 112, and other components of the network computing device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the network computing device 106 and other computing devices, such as the endpoint computing device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the network computing device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a system-on-a-chip (SoC) or otherwise form a portion of a SoC of the network computing device 106 (e.g., incorporated on a single integrated circuit chip along with a processor 110, the memory 112, and/or other components of the network computing device 106). Alternatively, in some embodiments, the specialized circuitry, hardware, or combination thereof may be embodied as one or more discrete processing units of the network computing device 106, each of which may be capable of performing one or more of the functions described herein.

The illustrative communication circuitry 118 includes a NIC 120, which may also be referred to as a host fabric interface (HFI) in some embodiments (e.g., high-performance computing (HPC) environments). The NIC 120 may be embodied as one or more add-in-boards, daughtercards, network interface cards, controller chips, chipsets, or other devices that may be used by the network computing device 106 to connect with another compute device (e.g., the endpoint computing device 102). In some embodiments, the NIC 120 may be embodied as part of a system-on-a-chip (SoC) that includes one or more processors, or included on a multichip package that also contains one or more processors. In some embodiments, the NIC 120 may include a local processor (not shown) and/or a local memory (not shown) that are both local to the NIC 120. In such embodiments, the local processor of the NIC 120 may be capable of performing one or more of the functions of a processor 110 described herein. Additionally or alternatively, in such embodiments, the local memory of the NIC 120 may be integrated into one or more components of the network computing device 106 at the board level, socket level, chip level, and/or other levels.

The one or more peripheral devices 122 may include any type of device that is usable to input information into the network computing device 106 and/or receive information from the network computing device 106. The peripheral devices 122 may be embodied as any auxiliary device usable to input information into the network computing device 106, such as a keyboard, a mouse, a microphone, a barcode reader, an image scanner, etc., or output information from the network computing device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the network computing device 106 may depend on, for example, the type and/or intended use of the network computing device 106. Additionally or alternatively, in some embodiments, the peripheral devices 122 may include one or more ports, such as a USB port, for example, for connecting external peripheral devices to the network computing device 106.

The endpoint computing device 102 may be embodied as any type of computation or computer device capable of performing the functions described herein, including, without limitation, a smartphone, a mobile computing device, a tablet computer, a laptop computer, a notebook computer, a computer, a modem, a server (e.g., stand-alone, rack-mounted, blade, etc.), a switch, a sled (e.g., a compute sled, an accelerator sled, a storage sled, a memory sled, etc.), a network appliance (e.g., physical or virtual), a web appliance, a distributed computing system, a processor-based system, and/or a multiprocessor system. It should be appreciated that, while only a single endpoint computing device 102 is illustratively shown, the network computing device 106 may be communicatively coupled to multiple endpoint computing devices 102 and/or other network computing devices 106.

While not illustratively shown, it should be further appreciated that each of the endpoint computing device 102 includes similar and/or like components to that of the illustrative network computing device 106. As such, figures and descriptions of the like components are not repeated herein for clarity of the description with the understanding that the description of the corresponding components provided above in regard to the network computing device 106 applies equally to the corresponding components of the endpoint computing device 102. Of course, it should be appreciated that the endpoint computing device 102 may include additional and/or alternative components, depending on the embodiment.

The network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the network computing device 106 and the endpoint computing device 102, which are not shown to preserve clarity of the description.

Figure 2:
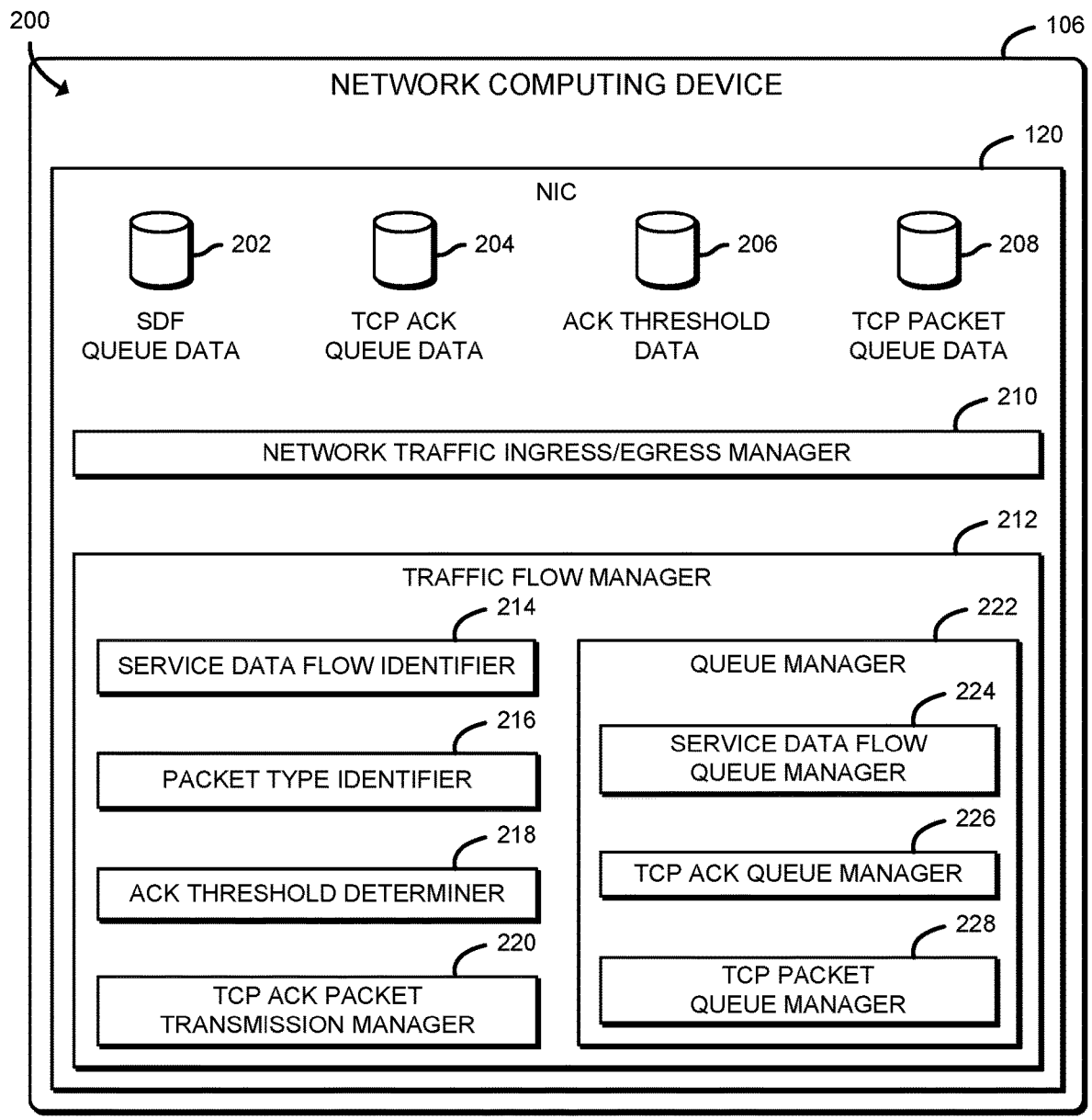
FIG. 2 is a simplified block diagram of at least one embodiment of an environment of the network computing device of the system of FIG. 1 which includes a traffic flow manager for managing TCP/IP packet delivery.

Referring now to FIG. 2, in use, the network computing device 106 establishes an environment 200 during operation. The illustrative environment 200 includes a network traffic ingress/egress manager 210 and a traffic flow manager 212. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 210, traffic flow management circuitry 212, etc.). It should be appreciated that, in such embodiments, one or more of the network traffic ingress/egress management circuitry 210 and the traffic flow management circuitry 212 may form a portion of one or more of the compute engine 108, the I/O subsystem 114, the communication circuitry 118, and/or other components of the network computing device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the compute engine 108 or other components of the network computing device 106. It should be appreciated that the network computing device 106 may include other components, sub-components, modules, sub-modules, logic, sub-logic, and/or devices commonly found in a computing device, which are not illustrated in FIG. 2 for clarity of the description. It should be further appreciated that while the traffic flow manager 212 is illustratively shown as being located in the NIC 120 of the network computing device 106, the traffic flow manager 212 may additionally or alternatively reside in the endpoint computing device 102.

In the illustrative environment 200, the network computing device 106 additionally includes service data flow (SDF) queue data 202, TCP ACK queue data 204, ACK threshold data 206, and TCP packet queue data 208, each of which may be accessed by the various components and/or sub-components of the network computing device 106. Further, each of the SDF queue data 202, the TCP ACK queue data 204, the ACK threshold data 206, and the TCP packet queue data 208 may be accessed by the various components of the network computing device 106. Additionally, it should be appreciated that, in some embodiments, the data stored in or otherwise represented by each of the SDF queue data 202, the TCP ACK queue data 204, the ACK threshold data 206, and the TCP packet queue data 208 may not be mutually exclusive relative to each other.

For example, in some implementations, data stored in the SDF queue data 202 may also stored as a portion of one or more of the TCP ACK queue data 204, the ACK threshold data 206, and the TCP packet queue data 208. As such, although the various data utilized by the network computing device 106 is described herein as particular discrete data, such data may be combined, aggregated, and/or otherwise form portions of a single or multiple data sets, including duplicative copies, in other embodiments. Additionally, while the SDF queue data 202, the TCP ACK queue data 204, the ACK threshold data 206, and the TCP packet queue data 208 are illustratively shown as being store local to the NIC 120, it should be appreciated that at least a portion of the data contained therein may be stored on the host (e.g., the memory 112, the data storage device(s) 116, etc.).

The network traffic ingress/egress manager 210, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 210 is configured to facilitate inbound network communications (e.g., network traffic, network packets, network flows, etc.) to the network computing device 106. Accordingly, the network traffic ingress/egress manager 210 is configured to manage (e.g., create, modify, delete, etc.) connections to physical and virtual network ports (i.e., virtual network interfaces) of the network computing device 106 (e.g., via the communication circuitry 118), as well as the ingress buffers/queues associated therewith. Additionally, the network traffic ingress/egress manager 210 is configured to facilitate outbound network communications (e.g., network traffic, network packet streams, network flows, etc.) from the network computing device 106. To do so, the network traffic ingress/egress manager 210 is configured to manage (e.g., create, modify, delete, etc.) connections to physical and virtual network ports/interfaces of the network computing device 106 (e.g., via the communication circuitry 118), as well as the egress buffers/queues associated therewith.

The traffic flow manager 212, which may be embodied as hardware, firmware, software, virtualized hardware, emulated architecture, and/or a combination thereof as discussed above, is configured to perform the TCP/IP packet delivery management functions described herein. To do so, the illustrative traffic flow manager 212 includes a service data flow identifier 214, a packet type identifier 216, an ACK number threshold determiner 218, a TCP ACK packet transmission manager 220, and a queue manager 222. The service data flow identifier 214, which may be embodied as hardware, firmware, software, virtualized hardware, emulated architecture, and/or a combination thereof as discussed above, is configured to identify a service data flow associated with a received IP packet. To do so, the service data flow identifier 214 is configured to retrieve identifying data from a header of each received IP packet. The identifying data may include any information which is usable to identify a service data flow type, such as a source IP address, a destination IP address, a source port number, a destination port number, an application associated with the IP packet, a workflow type of the IP packet, a protocol associated with the IP packet, and/or other data associated with the IP packet.

The packet type identifier 216 is configured to identify a type of a packet. For example, the packet may be one of a TCP data packet, a TCP ACK packet, an RoHC feedback packet, etc. Accordingly, to identify the type of the packet, the packet type identifier 216 is configured to retrieve information from at least a portion of the packet (e.g., at least a portion of a header, a payload, etc.) which is usable to identify the type of the packet. The identifying data may include any information which is usable to identify the type of packet, such as a source IP address, a destination IP address, a source port number, a destination port number, an application associated with the packet, a workflow type of the packet, a protocol associated with the packet, and/or other data associated with the packet. It should be appreciated that RoHC feedback packets are non-IP packets which are being identified using special header format in the PDCP layer. As such, it should be further appreciated that identifying the packet type may be explicit (e.g., by the PDCP layer) or by inspecting IP packet header contents, depending on the type of packet for which the type is being identified.

The ACK number threshold determiner 218 is configured to determine an ACK number threshold usable to limit the number of TCP ACK packets transmitted over a given period of time (e.g., as managed by the TCP ACK packet transmission manager 220) in response to having received an indication that TCP ACK packets are to be transmitted from a particular TCP ACK queue. To do so, the ACK number threshold determiner 218 is configured to determine an ACK number threshold as a function of an average throughput of the TCP ACK queue, an amount of time that has elapsed since the last transmission request was received (e.g., by the TCP ACK packet transmission manager 220), a TCP ACK number of a TCP ACK packet at a tail of the TCP ACK queue, and a weight relative to a throughput increase percentage (i.e., a percentage of throughput increase). In other words, the weight, or the throughput increase percentage, is used to increase the ACK number threshold, thereby increasing the number of TCP ACK packets that can be provisioned. Accordingly, the ACK number threshold determiner 218 is additionally configured to determine a download throughput for a TCP ACK queue and the average throughput as a function of the download throughput, a most recently determined average throughput, and a weight that is applied to both the download throughput and the most recently determined average throughput. In some embodiments, the TCP ACK number threshold, the download throughput, the average throughput, and any other throughput information may be stored in the ACK threshold data 206.

The TCP ACK packet transmission manager 220 is configured to determine a number of packets that are to be transmitted over a given period of time. For example, the TCP ACK packet transmission manager 220 may receive a request to transmit TCP ACK packets from a TCP ACK queue managed by the queue manager 222. Upon receiving the transmit request, the TCP ACK packet transmission manager 220 may be configured to retrieve an ACK number threshold (e.g., as determined by the ACK number threshold determiner 218) which can be used to limit the number of TCP ACK packets transmitted in response to the request (e.g., to reduce burstiness). To do so, the TCP ACK packet transmission manager 220 may be configured to compare the determined ACK number threshold to the TCP ACK number associated with a TCP ACK packet at a head of the TCP ACK queue, and determine whether to extract (e.g., via the TCP ACK queue manager 226 of the queue manager 222) and transmit that TCP ACK packet as a function of the comparison.

The queue manager 222, which may be embodied as hardware, firmware, software, virtualized hardware, emulated architecture, and/or a combination thereof as discussed above, is configured to manage the queues (i.e., enqueue and dequeue packets) used by the traffic flow manager 212. To do so, the illustrative queue manager 222 includes a service data flow queue manager 224 to manage the service data flow queues described herein, a TCP ACK queue manager 226 to manage the TCP ACK queues described herein, and a TCP packet queue manager 228 to manage the TCP packet queues described herein. Accordingly, each of the service data flow queue manager 224, the TCP ACK queue manager 226, and the TCP packet queue manager 228 are configured to determine where to enqueue packets in the respective queues and when to dequeue packets from the respective queues. It should be appreciated that each of the service data flow queue manager 224, the TCP ACK queue manager 226, and the TCP packet queue manager 228 may store queue related data and/or the queues themselves in their respective queue data containers (i.e., the SDF queue data 202, the TCP ACK queue data, and the TCP packet queue data), in some embodiments.

For example, the service data flow queue manager 224 may be configured to determine a queue associated with the service data flow type for each IP packet received (e.g., based on an indication received from the service data flow identifier 214) and enqueue the received IP packets into their respective queues. To do so, the service data flow queue manager 224 is configured to determine whether the queue in which an IP packet is to be enqueued is out of order and, if so, enqueue the IP packet to a position in the queue as a function of a TCP sequence number associated with the IP packet (e.g., contained in the header of the IP packet). Otherwise, if the IP packets presently enqueued in the queue are in order, the service data flow queue manager 224 is configured to enqueue the IP packet at a tail of the queue.

In another example, the queue manager 222 may be configured to determine whether to deliver an IP packet based on what type of IP packet is in a particular queue. For example, the queue manager 222 may receive an indication that a packet from a particular queue is to be delivered to the next level layer (e.g., the IP stack at the host side). If the queue manager 222 identifies the packet at the head of the queue as being a type of packet (e.g., as may be determined by the packet type identifier 216) that does not require the queue being in order (e.g., RoHC feedback packets) the queue manager 222 may be configured to deliver such packets to the next layer (e.g., to an RoHC compressor entity) irrespective of whether the packets in the queue are in order or out of order.

Figure 3:
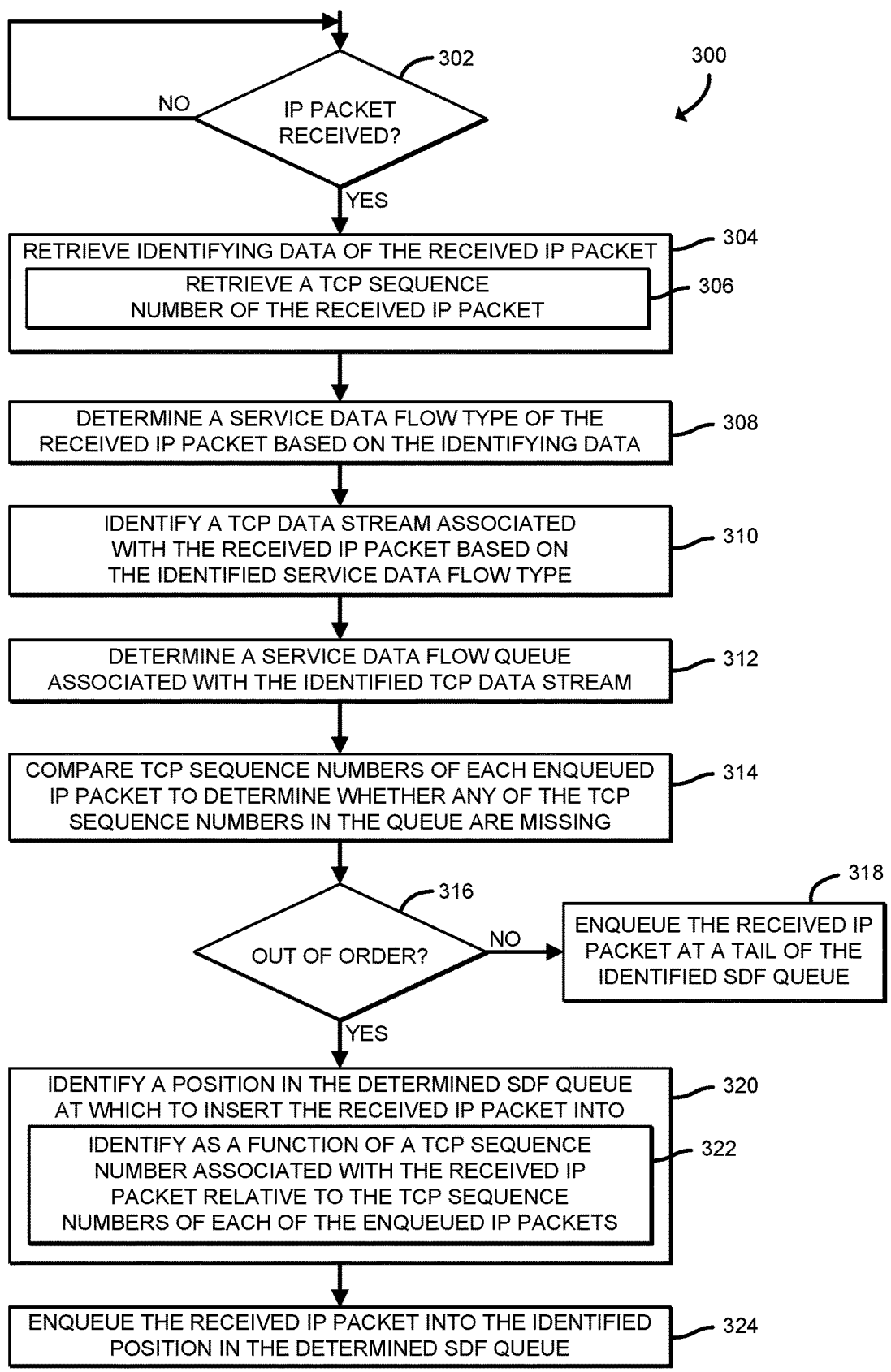
FIG. 3 is a simplified flow diagram of at least one embodiment of a method for managing out-of-order delivery of IP packets via lower layer Automatic Repeat reQuest (ARQ) protocols that may be executed by the network computing device of FIGS. 1 and 2.

Referring now to FIG. 3, a method for managing out-of-order delivery of IP packets via lower layer ARQ protocols is shown which may be executed by a computing device (e.g., the network computing device 106 of FIG. 1), or more particularly by a traffic flow manager of a NIC of the computing device (e.g., the traffic flow manager 212 of the NIC 120 of the network computing device 106). As described previously, the traffic flow manager 212 is configured to reside between the ARQ L2 layer and the IP stack at the host side. Accordingly, during out of order phase of link ARQ, the traffic flow manager is configured to receive the re-assembled raw IP packets from link ARQ and detect in order service data flows while delaying the delivery of out of order service data flow packets until link ARQ either returns back to an in order state or provides missing packets that return the service data flow back to an in order state by inserting the missing packets upon receipt.

The method 300 begins with block 302, in which the traffic flow manager 212 determines whether an IP packet has been received by the NIC 120. If so, the method 300 advances to block 304, in which the traffic flow manager 212 inspects a header of the received IP packet to retrieve identifying data of the received IP packet usable to identify a service data flow type of the received IP packet. As described previously, the identifying data may be retrieved from a header of the received IP packet (i.e., by parsing the header) and can include any information which is usable to identify a service data flow type, such as a source IP address, a destination IP address, a source port number, a destination port number, an application associated with the IP packet, a workflow type of the IP packet, a protocol associated with the IP packet, and/or other data associated with the IP packet. Additionally, in block 306, the traffic flow manager 212 retrieves a TCP sequence number of the received IP packet.

In block 308, the traffic flow manager 212 identifies a service data flow type of the received IP packet based on at least a portion of the retrieved identifying data. In block 310, the traffic flow manager 212 identifies a TCP data stream associated with the received IP packet based on the identified service data flow type. In block 312, the traffic flow manager 212 determines a service data flow queue associated with the identified TCP data stream. In block 314, the traffic flow manager 212 compares a TCP sequence number of each of the IP packets presently enqueued in the identified service data flow queue.

In block 316, the traffic flow manager 212 determines whether the IP packets presently enqueued in the identified service data flow queue are out of order based on a result of the comparison. If not, the method 300 branches to block 318, in which the traffic flow manager 212 enqueues the received IP packet at a tail of the identified service data flow queue and a dequeue can be performed on all the IP packets in the identified service data flow queue. Otherwise, if the IP packets are determined to be out of order, the method branches to block 320, in which the traffic flow manager 212 identifies a position in the service data flow queue at which to insert the received IP packet.

In block 322, the traffic flow manager 212 identifies the position in the service data flow queue as a function of a TCP sequence number associated with the received IP packet relative to the TCP sequence numbers of the presently enqueued IP packets. In block 324, the traffic flow manager 212 enqueues the received IF packet into the identified position in the service data flow queue. It should be appreciated that, for out of order queues, dequeue operations can be performed for packets starting from the tail of a service data flow queue that contains TCP sequence number contiguous IP packets until an IF packet with a gap in the TCP sequence number space is at the tail of the service data flow queue.

Figure 4:
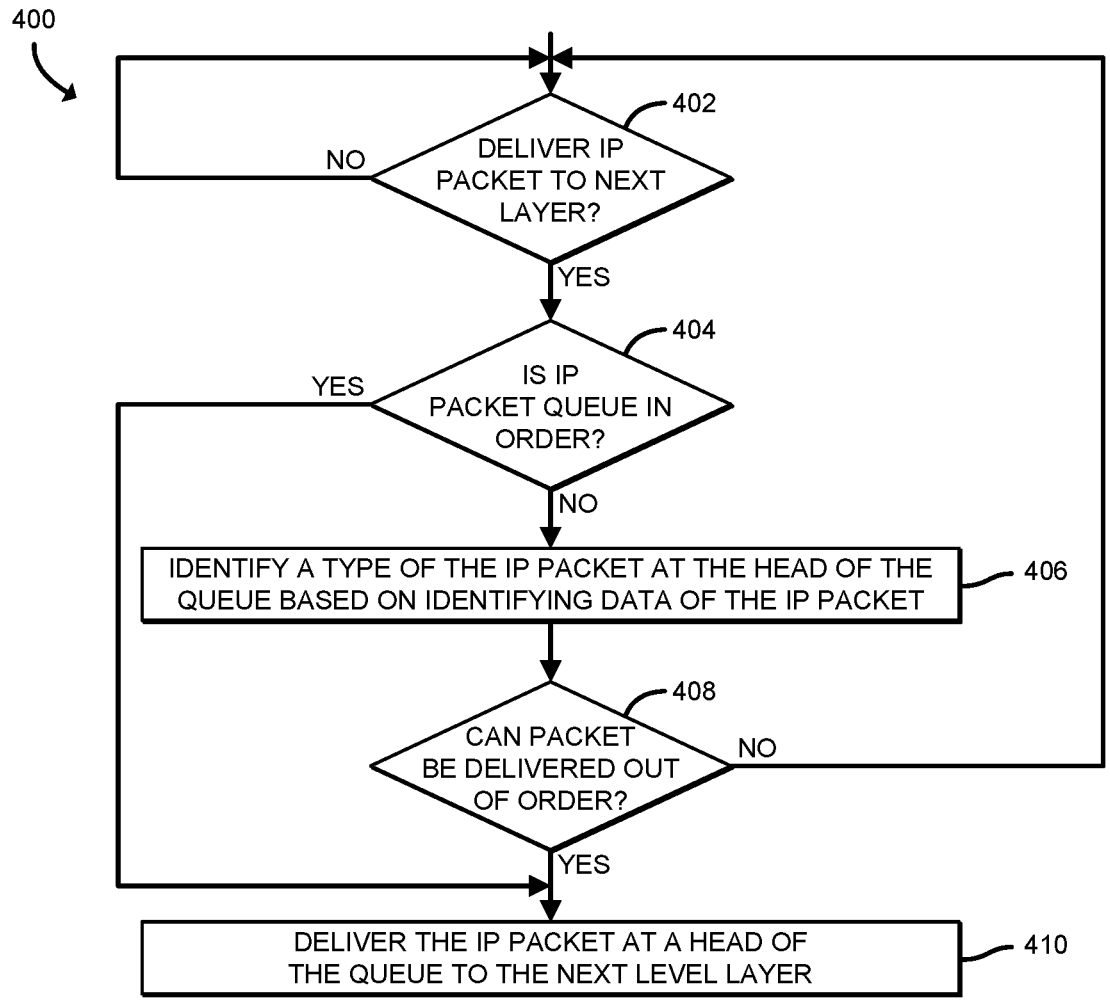
FIG. 4 is a simplified flow diagram of at least one embodiment of a method for managing out-of-order delivery of Robust Header Compression (RoHC) feedback packets via lower layer ARQ protocols that may be executed by the network computing device of FIGS. 1 and 2.

Referring now to FIG. 4, a method 400 for managing out of order delivery of PDCP interspersed feedback packets to an RoHC compressor entity (i.e., RoHC feedback packets) via lower layer ARQ protocols is shown which may be executed by a computing device (e.g., the network computing device 106 of FIG. 1), or more particularly by a traffic flow manager of a NIC of the computing device (e.g., the traffic flow manager 212 of the NIC 120 of the network computing device 106). Accordingly, unlike present technologies which restrict the delivery of RoHC feedback packets to the PDCP sublayer to being in order, the traffic flow manager 212 may provide a higher compression efficiency for ACK packets and a faster decompressor recovery for NACK (negative ACK) packets relative to the effects of requiring the delivery of RoHC feedback packet types in order by providing out of order delivery of such packets.

The method 400 begins with block 402, in which the traffic flow manager 212 determines whether to deliver a presently enqueued IP packet to the next the next level layer. If so, the method 400 advances to block 404, in which the traffic flow manager 212 determines whether the IP packet queue is in order. If so, the method 400 jumps to block 410, which is described below; otherwise, if not, the method 400 advances to block 406. In block 406, the traffic flow manager 212 identifies a type of the IP packet at the head of the queue based on identifying data of the IP packet. In block 408, the traffic flow manager 212 determines whether the IP packet type corresponds to an IP packet type that can be delivered out of order, such as an RoHC feedback packet type.

If the traffic flow manager 212 determines the IP packet type does not correspond to an RoHC feedback packet type, the method 400 returns to block 402 to determine whether to deliver an IP packet to the next layer (e.g., iterate the method 400 again to determine whether the packet queue is in order and an IP packet at the head of the queue not having an RoHC feedback packet type may then be delivered). Otherwise, if the IP packet type corresponds to an RoHC feedback packet type, the method 400 advances to block 410, in which the traffic flow manager 212 delivers the IP packet (i.e., the RoHC feedback packet) at the head of the queue to the next level layer. In other words, while typically only packets enqueued in an in order queue can be delivered, there may be certain IP packet types (e.g., the RoHC feedback packet) which can be delivered out of order such that the benefit of delivering the IP packet out of order outweighs any potential cost of delaying the delivery. As such, it should be appreciated that while only a RoHC feedback packet type has been illustratively shown as being the only IP packet type being compared, there may be various other IP packet types which can be delivered even if the queue is out of order.

Figure 5:
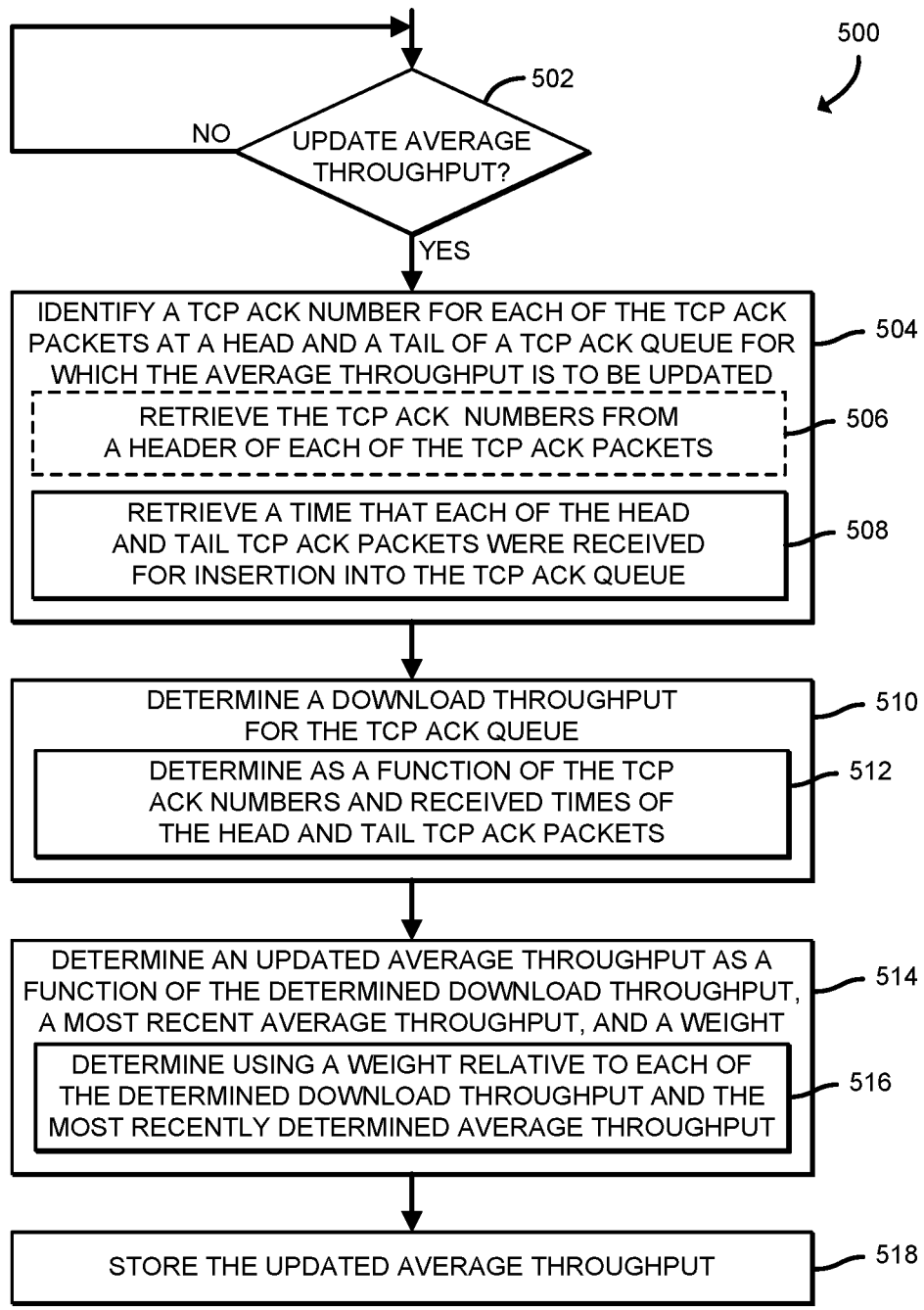
FIG. 5 is a simplified flow diagram of at least one embodiment of a method for updating an average throughput for a TCP download stream that may be executed by the network computing device of FIGS. 1 and 2.

Referring now to FIG. 5, a method 500 for updating an average throughput for a TCP download stream is shown which may be executed by a computing device (e.g., the network computing device 106 of FIG. 1), or more particularly by a traffic flow manager of a NIC of the computing device (e.g., the traffic flow manager 212 of the NIC 120 of the network computing device 106). The method 500 begins with block 502, in which the traffic flow manager 212 determines whether to update an average throughput for a particular TCP ACK queue. If so, the method 500 advances to block 504, in which the traffic flow manager 212 identifies a TCP ACK number of the TCP packet at a head of the TCP ACK queue and a tail of the TCP ACK queue.

For example, in block 506, the traffic flow manager 212 may retrieve the TCP ACK numbers from a header of each of the TCP ACK packets. It should be appreciated that the TCP ACK packet at the head of the TCP ACK queue represents the oldest TCP ACK packet in time presently enqueued, whereas the TCP ACK packet at the tail of the TCP ACK queue represents the newest TCP ACK packet in time which has been enqueued in the TCP ACK queue. As such, the head and tail TCP ACK packets can be used to define the number of acknowledged data bytes via the TCP acknowledgement number in the TCP header of the IP packet. Additionally, in block 508, the traffic flow manager 212 retrieves a time that each of the head and tail TCP ACK packets were received from insertion into the TCP ACK queue.

In block 510, the traffic flow manager 212 determines a download throughput for the TCP ACK queue. For example, in block 512, the traffic flow manager 212 determines the download throughput for the TCP ACK queue as a function of the TCP ACK numbers and received times of the head and tail TCP ACK packets. In block 514, the traffic flow manager 212 determines an updated average throughput as a function of the determined download throughput, a most recent average throughput (i.e., the average throughput calculated during the previous iteration of the method 500), and a weight amount.

In block 516, the traffic flow manager 212 determines the updated average throughput using the weight amount relative to each of the download throughput determined in block 510 and the most recent average throughput. In other words, the weight amount applied to the download throughput determined in block 510 is percentage represented as a decimal value between 0 and 1 (e.g., 80% or 0.8) and the weight amount applied to the most recent average throughput is the remainder of one minus the decimal value applied to the download throughput determined in block 510 (e.g., 1−0.8=0.2). In block 518, the traffic flow manager 212 stores the updated average throughput (e.g., in the ACK threshold data 206 of FIG. 2).

Figure 6:
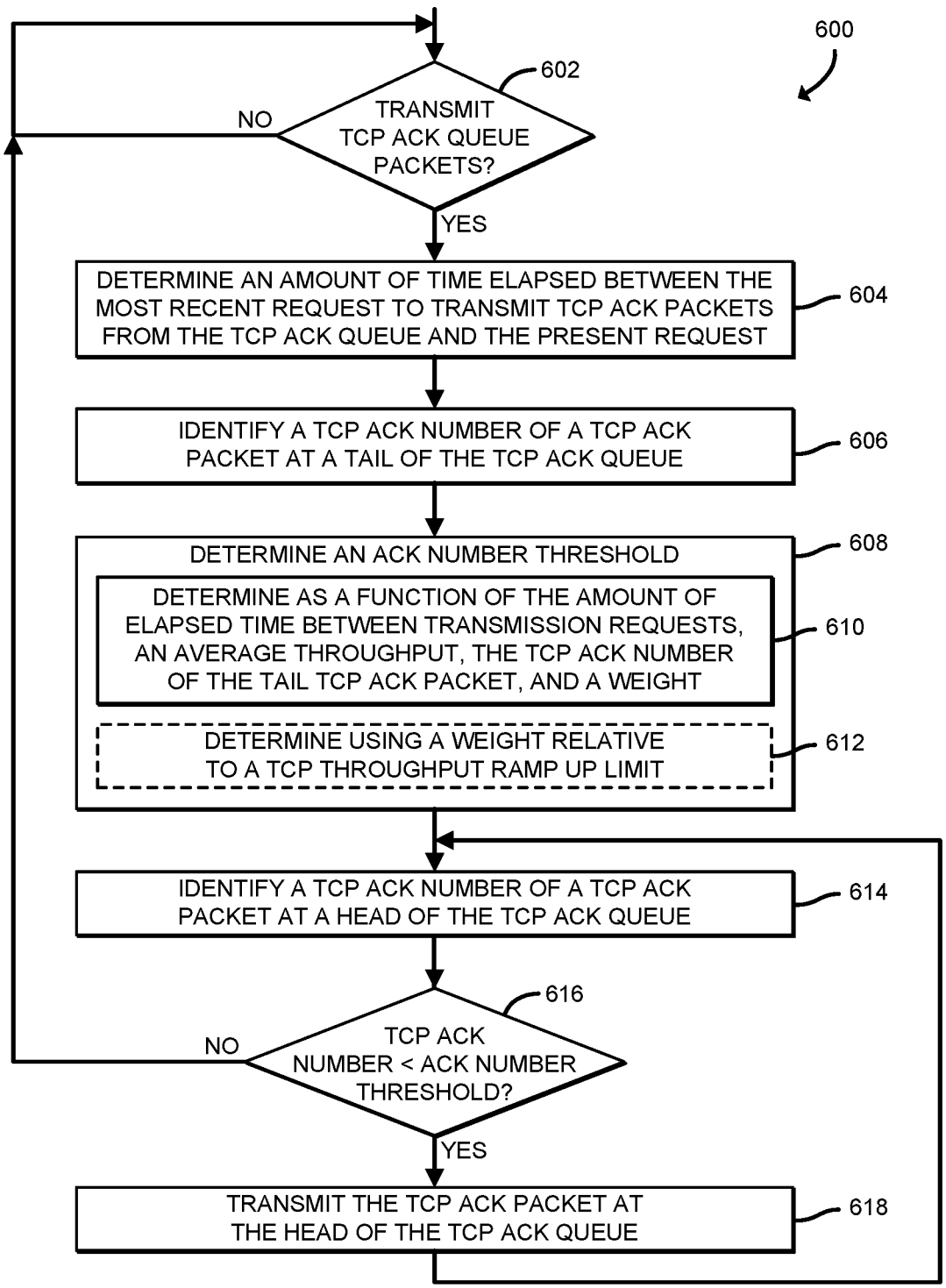
FIG. 6 is a simplified flow diagram of at least one embodiment of a method for limiting the transmission of TCP acknowledgment (ACK) packets in a TCP ACK queue that may be executed by the network computing device of FIGS. 1 and 2.

Referring now to FIG. 6, a method 600 for limiting the transmission of TCP ACK packets in a TCP ACK queue is shown which may be executed by a computing device (e.g., the network computing device 106 of FIG. 1), or more particularly by a traffic flow manager of a NIC of the computing device (e.g., the traffic flow manager 212 of the NIC 120 of the network computing device 106). Accordingly, by limiting the transmission of TCP ACK packets (i.e., not sending more TCP ACK packets than needed to keep the averaged throughput stable), round trip time variance can be reduced, bursts can effectively be flattened, and TCP throughput can be increased.

The method 600 begins with block 602, in which the traffic flow manager 212 determines whether to transmit a number of TCP ACK packets from a TCP ACK queue (e.g., in response to having received an uplink data request). If so, the method 600 advances to block 604, in which the traffic flow manager 212 determines an amount of time which has elapsed between the most recent previously received request to transmit TCP ACK packets from the TCP ACK queue and the present request received in block 602.

In block 606, the traffic flow manager 212 determines a TCP ACK number of a TCP ACK packet at a head of the TCP ACK queue. In block 608, the traffic flow manager 212 determines an ACK number threshold. To do so, in block 610, the traffic flow manager 212 determines the ACK number threshold as a function of the amount of time elapsed between transmission requests determined in block 604, a most recently determined average throughput (see, e.g., the method 500 of FIG. 5), the TCP ACK number of the head TCP ACK packet determined in block 606, and a weight amount. In block 612, in some embodiments, the traffic flow manager 212 determines the weight amount based on a percentage of throughput increase. In other words, as described previously the weight (i.e., the throughput increase percentage) is used to increase the ACK number threshold, thereby increasing the number of TCP ACK packets that can be provisioned.

In block 614, the traffic flow manager 212 identifies a TCP ACK number of a TCP ACK packet at a tail of the TCP ACK queue. In block 616, the traffic flow manager 212 determines whether the TCP ACK number is less than the ACK number threshold determined in block 608. If not, the method 600 returns to block 602 to determine whether another request to transmit TCP ACK packets from the TCP ACK queue has been received. Otherwise, the method 600 advances to block 618, in which the traffic flow manager 212 transmits the TCP ACK packet at the head of the TCP ACK queue before returning to block 614 to identify the TCP ACK number of the TCP ACK packet now at the head of the TCP ACK queue.

Figure 7:
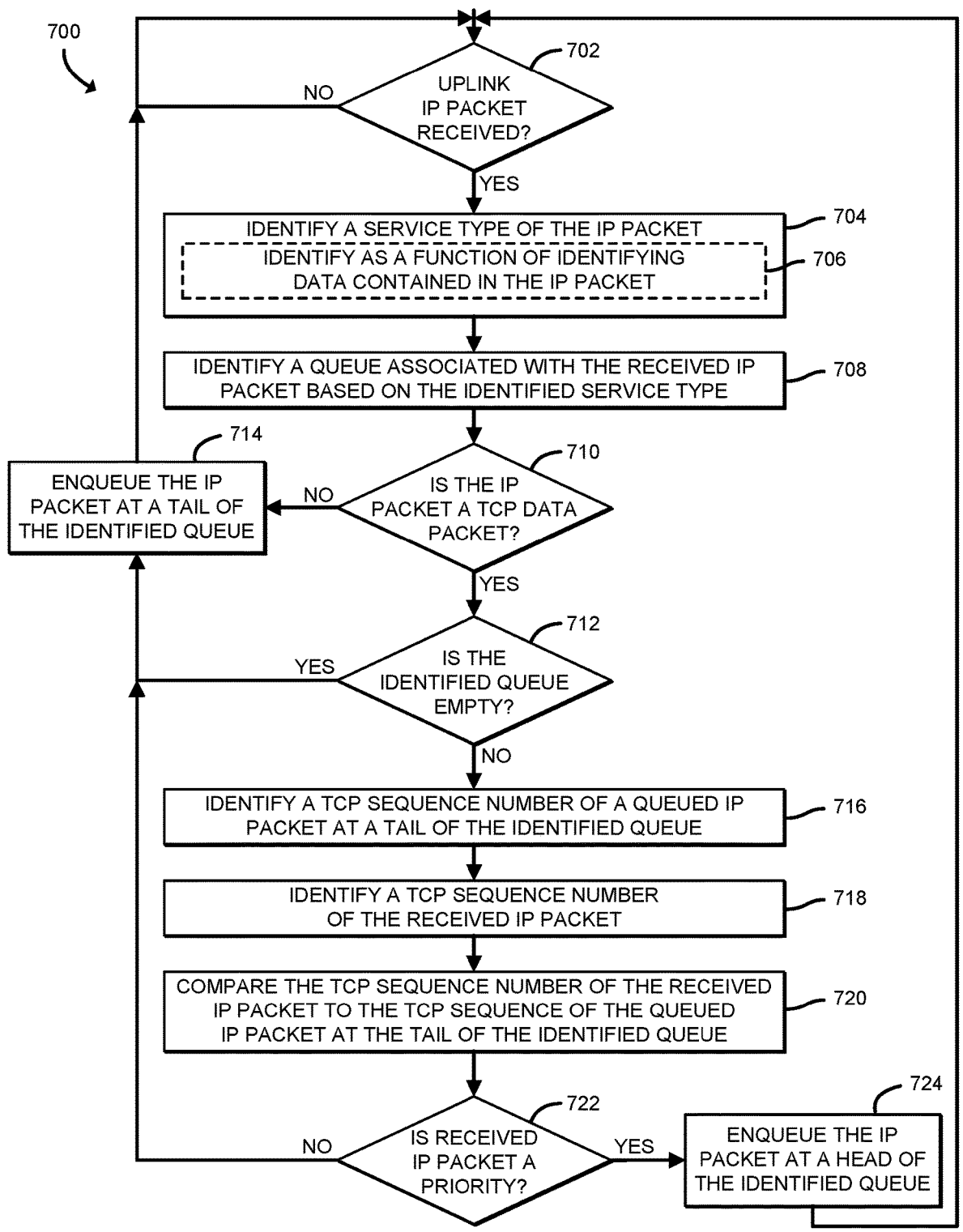
FIG. 7 is a simplified flow diagram of at least one embodiment of a method for detecting and prioritizing uplink TCP retransmitted IP data packets that may be executed by the network computing device of FIGS. 1 and 2.

Referring now to FIG. 7, a method 700 for detecting and prioritizing uplink TCP retransmitted IP data packets is shown which may be executed by a computing device (e.g., the network computing device 106 of FIG. 1), or more particularly by a traffic flow manager of a NIC of the computing device (e.g., the traffic flow manager 212 of the NIC 120 of the network computing device 106). It should be appreciated that, prior to the method 700, the traffic flow manager 212 has already separated all uplink services (e.g., TCP/IP streams) into separate queues. As such, the traffic flow manager 212 can monitor the TCP sequence number of each packet of an uplink TCP stream. Accordingly, upon detection of an old sequence number, keeping into consideration the TCP sequence number wrap-around case, the related IP packet can be placed at the beginning of the queue as described herein. Doing so can result in improved RTT of the TCP retransmitted packets and faster TCP transfers, which can result in faster recovery from packet loss, reduce the likelihood of TCP retransmission timeouts, and reduce TCP slow starts, relative to present techniques.

The method 700 begins with block 702, in which the traffic flow manager 212 determines whether an uplink IP packet has been received. If so, the method 700 advances to block 704, in which the traffic flow manager 212 identifies a service type of the IP packet. To do so, in block 706, the traffic flow manager 212 identifies the service type as a function of identifying data contained in the IP packet (e.g., data contained in the header and/or payload of the IP packet). As described previously, the identifying data may include any information which is usable to identify the service type of packet, such as a source IP address, a destination IP address, a source port number, a destination port number, an application associated with the packet, a workflow type of the packet, a protocol associated with the packet, and/or other data associated with the packet.

In block 708, the traffic flow manager 212 identifies a queue associated with the received IP packet based on the service type identified in block 704. In block 710, the traffic flow manager 212 determines whether the IP packet is a TCP data packet (e.g., based on at least a portion of the identifying information). If not, method 700 branches to block 714, in which the traffic flow manager 212 enqueues the IP packet at a tail of the queue identified in block 708. Otherwise, if the IP packet is determined to be a TCP data packet, the method 700 branches to block 712, in which the traffic flow manager 212 determines whether the identified queue is empty. If so, the method 700 branches to block 714, in which the traffic flow manager 212 enqueues the IP packet at a tail of the queue identified in block 708. Otherwise, if the identified queue is determined to be empty in block 712, the method 700 branches to block 716.

In block 716, the traffic flow manager 212 identifies a TCP sequence number of an enqueued IP packet at a tail of the identified queue. In block 718, the traffic flow manager 212 identifies a TCP sequence number of the received IP packet (e.g., from a designated field in a header of the IP packet). In block 720, the traffic flow manager 212 compares the TCP sequence of the enqueued IP packet at the tail of the identified queue to the TCP sequence number of the received IP packet. In block 722, the traffic flow manager 212 determines whether the received IP packet is a priority as a result of the comparison performed in block 720. To do so, for example, the traffic flow manager 212 determines whether the received IP packet is earlier in the TCP sequence than the enqueued IP packet at the tail of the identified queue as a function of the TCP sequence number of the received IP packet relative to the TCP sequence number of the tail IP packet.

If the traffic flow manager 212 determines the TCP sequence number of the received IP packet is earlier in the TCP sequence than the TCP sequence number of the enqueued IP packet at the tail of the identified queue, the method branches to block 724. In block 724, the traffic flow manager 212 enqueues the IP packet at a head of the identified queue before the method 700 returns to block 702 to determine whether another uplink IP packet has been received. Otherwise, if the traffic flow manager 212 determines the TCP sequence number of the received IP packet is not earlier in the TCP sequence than the TCP sequence number of the enqueued IP packet at the tail of the identified queue, the method branches to block 714. As described previously, in block 714, the traffic flow manager 212 enqueues the IP packet at a tail of the queue identified in block 708 before returning to block 702 to determine whether another uplink IP packet has been received.

EXAMPLES

Illustrative examples of the technologies disclosed herein are provided below. An embodiment of the technologies may include any one or more, and any combination of, the examples described below.

Example 1 includes a computing device for managing Transmission Control Protocol/Internet Protocol (TCP/IP) packet delivery, the computing device comprising a compute engine; and a network interface controller (NIC) to receive an IP packet; retrieve identifying data of the received IP packet; identify a TCP data stream associated with the received IP packet based on the retrieved identifying data; determine a service data flow queue associated with a TCP data stream; determine whether a plurality of IP packets presently enqueued in the determined service data flow queue are out of order; and enqueue, in response to a determination that the plurality of IP packets presently enqueued in the determined service data flow queue are out of order, the received IP packet at a tail of the identified service data flow queue.

Example 2 includes the subject matter of Example 1, and wherein the NIC is further to identify, in response to a determination that the plurality of IP packets presently enqueued in the determined service data flow queue are not out of order, a position in the service data flow queue in which to insert the enqueued IP packet relative to the plurality of IP packets presently enqueued in the determined service data flow queue; and enqueue the received IP packet at the identified position in the identified service data flow queue.

Example 3 includes the subject matter of any of Examples 1 and 2, and wherein the NIC is further to retrieve a TCP sequence number of the received IP packet, and wherein to identify the position in the service data flow queue in which to insert the enqueued IP packet relative to the plurality of IP packets presently enqueued in the determined service data flow queue comprises to compare the retrieved TCP sequence number of the received IP packet to a respective TCP sequence number of at least a portion of the plurality of IP packets presently enqueued in the determined service data flow queue.

Example 4 includes the subject matter of any of Examples 1-3, and wherein to receive the IP packet comprises to receive the IP packet in a re-assembled and unencrypted condition.

Example 5 includes the subject matter of any of Examples 1-4, and wherein to retrieve the identifying data comprises to retrieve at least one of a source IP address, a destination IP address, a source port number, a destination port number, an application associated with the packet, a workflow type of the packet, and a protocol associated with the packet.

Example 6 includes the subject matter of any of Examples 1-5, and wherein to retrieve the identifying data of the received IF packet comprises to retrieve the identifying data from a header of the received IP packet.

Example 7 includes the subject matter of any of Examples 1-6, and wherein to determine whether the plurality of IP packets presently enqueued in the determined service data flow queue are out of order comprises to (i) identify a TCP sequence number of each of the plurality of enqueued IP packets and (ii) determine whether any of the identified TCP sequence numbers are missing.

Example 8 includes the subject matter of any of Examples 1-7, and wherein to determine whether any of the identified TCP sequence numbers are missing comprises to determine whether any TCP sequence numbers are missing between a first TCP sequence number of an enqueued IP packet of the plurality of enqueued IP packets at a head of the service data flow queue and a second TCP sequence number of another enqueued IP packet of the plurality of enqueued IP packets at a tail of the service data flow queue.

Example 9 includes the subject matter of any of Examples 1-8, and wherein the NIC is further to receive an indication to deliver an IP packet of the plurality of enqueued IP packets to an IP stack managed by the compute engine, wherein the IP packet is enqueued at a head of the service data flow queue; determine, in response to having received the indication to deliver the IP packet, whether the service data flow queue is out of sequential order; identify, in response to a determination that the service data flow queue is out of sequential order, a type of the IP packet; determine whether the type of the IP packet corresponds to one or more types of IP packets which can be delivered out of order; and deliver, in response to a determination that the IP packet corresponds to the one or more types of IP packets which can be delivered out of order, the IP packet to the IP stack.

Example 10 includes the subject matter of any of Examples 1-9, and wherein to identify the type of the IP packet comprises to (i) retrieve identifying data of the IP packet and (ii) identify the type of the other IP packet based on the retrieved identifying data of the IP packet.

Example 11 includes the subject matter of any of Examples 1-10, and wherein the NIC is further to deliver, in response to a determination that the service data flow queue is in sequential order, the IP packet to the IP stack.

Example 12 includes the subject matter of any of Examples 1-11, and wherein the type of the IP packet is a Robust Header Compression (RoHC) feedback packet type.

Example 13 includes one or more machine-readable storage media comprising a plurality of instructions stored thereon that, in response to being executed, cause a computing device to receive, by a network interface controller (NIC) of the computing device, an IP packet; retrieve, by the NIC, identifying data of the received IP packet; identify, by the NIC, a TCP data stream associated with the received IP packet based on the retrieved identifying data; determine, by the NIC, a service data flow queue associated with a TCP data stream; determine, by the NIC, whether a plurality of IP packets presently enqueued in the determined service data flow queue are out of order; and enqueue, by the NIC and in response to a determination that the plurality of IP packets presently enqueued in the determined service data flow queue are out of order, the received IP packet at a tail of the identified service data flow queue.

Example 14 includes the subject matter of Example 13, and wherein the plurality of instructions further cause the NIC to identify, in response to a determination that the plurality of IP packets presently enqueued in the determined service data flow queue are not out of order, a position in the service data flow queue in which to insert the enqueued IP packet relative to the plurality of IP packets presently enqueued in the determined service data flow queue; and enqueue the received IP packet at the identified position in the identified service data flow queue.

Example 15 includes the subject matter of any of Examples 13 and 14, and wherein the plurality of instructions further cause the NIC to retrieve a TCP sequence number of the received IP packet, and wherein to identify the position in the service data flow queue in which to insert the enqueued IP packet relative to the plurality of LP packets presently enqueued in the determined service data flow queue comprises to compare the retrieved TCP sequence number of the received IP packet to a respective TCP sequence number of at least a portion of the plurality of IP packets presently enqueued in the determined service data flow queue.

Example 16 includes the subject matter of any of Examples 13-15, and wherein to retrieve the identifying data comprises to retrieve at least one of a source IP address, a destination IP address, a source port number, a destination port number, an application associated with the packet, a workflow type of the packet, and a protocol associated with the packet.

Example 17 includes the subject matter of any of Examples 13-16, and wherein to determine whether the plurality of IP packets presently enqueued in the determined service data flow queue are out of order comprises to (i) identify a TCP sequence number of each of the plurality of enqueued IP packets and (ii) determine whether any of the identified TCP sequence numbers are missing.

Example 18 includes the subject matter of any of Examples 13-17, and wherein to determine whether any of the identified TCP sequence numbers are missing comprises to determine whether any TCP sequence numbers are missing between a first TCP sequence number of an enqueued IP packet of the plurality of enqueued IP packets at a head of the service data flow queue and a second TCP sequence number of another enqueued IP packet of the plurality of enqueued IP packets at a tail of the service data flow queue.

Example 19 includes the subject matter of any of Examples 13-18, and wherein the plurality of instructions further cause the NIC to receive an indication to deliver an IP packet of the plurality of enqueued IP packets to an IP stack managed by the compute engine, wherein the IP packet is enqueued at a head of the service data flow queue; determine, in response to having received the indication to deliver the IP packet, whether the service data flow queue is out of sequential order; identify, in response to a determination that the service data flow queue is out of sequential order, a type of the IP packet; determine whether the type of the IP packet corresponds to one or more types of IP packets which can be delivered out of order; and deliver, in response to a determination that the IP packet corresponds to the one or more types of IP packets which can be delivered out of order, the IP packet to the IP stack.

Example 20 includes the subject matter of any of Examples 13-19, and wherein to identify the type of the IP packet comprises to (i) retrieve identifying data of the IP packet and (ii) identify the type of the other IP packet based on the retrieved identifying data of the IP packet.

Example 21 includes the subject matter of any of Examples 13-20, and wherein the plurality of instructions further cause the NIC to deliver, in response to a determination that the service data flow queue is in sequential order, the IP packet to the IP stack.

Example 22 includes a computing device for managing Transmission Control Protocol/Internet Protocol (TCP/IP) packet delivery, the computing device comprising circuitry to receive an IP packet; circuitry to retrieve identifying data of the received IP packet; means for identifying a TCP data stream associated with the received IP packet based on the retrieved identifying data; means for determining a service data flow queue associated with a TCP data stream; means for determining whether a plurality of IP packets presently enqueued in the determined service data flow queue are out of order; and circuitry to enqueue, in response to a determination that the plurality of IP packets presently enqueued in the determined service data flow queue are out of order, the received IP packet at a tail of the identified service data flow queue.

Example 23 includes the subject matter of Example 22, and further including means for identifying, in response to a determination that the plurality of IP packets presently enqueued in the determined service data flow queue are not out of order, a position in the service data flow queue in which to insert the enqueued IP packet relative to the plurality of IP packets presently enqueued in the determined service data flow queue; and circuitry to enqueue the received IP packet at the identified position in the identified service data flow queue.

Example 24 includes the subject matter of any of Examples 22 and 23, and further including circuitry to retrieve a TCP sequence number of the received IP packet, and wherein the means for identifying the position in the service data flow queue in which to insert the enqueued IP packet relative to the plurality of IP packets presently enqueued in the determined service data flow queue comprises means for comparing the retrieved TCP sequence number of the received IP packet to a respective TCP sequence number of at least a portion of the plurality of IP packets presently enqueued in the determined service data flow queue.

Example 25 includes the subject matter of any of Examples 22-24, and further including circuitry to receive an indication to deliver an IP packet of the plurality of enqueued IP packets to an IP stack managed by the compute engine, wherein the IP packet is enqueued at a head of the service data flow queue; means for determining, in response to having received the indication to deliver the IP packet, whether the service data flow queue is out of sequential order; means for identifying, in response to a determination that the service data flow queue is out of sequential order, a type of the IP packet; means for determining whether the type of the IP packet corresponds to one or more types of IP packets which can be delivered out of order; and circuitry to deliver, in response to a determination that the IP packet corresponds to the one or more types of IP packets which can be delivered out of order, the IP packet to the IP stack.

The invention claimed is:

1. A computing device for managing Transmission Control Protocol/Internet Protocol (TCP/IP) packet delivery, the computing device comprising:

a compute engine; and
a network interface controller (NIC) to:
    receive an IP packet;
    retrieve identifying data of the received IP packet;
    identify a TCP data stream associated with the received IP packet based on the retrieved identifying data;
    determine a service data flow queue associated with the TCP data stream;
    determine whether a plurality of IP packets presently enqueued in the determined service data flow queue are out of order by (i) identifying TCP sequence numbers of the plurality of enqueued IP packets and (ii) determining whether any of the identified TCP sequence numbers are missing between a first TCP sequence number of a first enqueued IP packet of the plurality of IP packets at a head of the service data flow queue and a second TCP sequence number of a second enqueued IP packet of the plurality of enqueued IP packets at a tail of the service data flow queue;
    enqueue, as a function of whether the plurality of IP packets presently enqueued in the determined service data flow queue are out of order, the received IP packet at the tail of the determined service data flow queue;
    determine whether an uplink TCP/IP packet is to be retransmitted from the computing device; and
    enqueue, in response to a determination that the uplink TCP/IP packet is to be retransmitted, the uplink TCP/IP packet at the head of the determined service data flow queue to be transmitted before one or more other packets presently enqueued in the determined service data flow queue.

2. The computing device of claim 1, wherein the NIC is further to:
identify, in response to determination that the plurality of IP packets presently enqueued in the determined service data flow queue are not out of order, a position in the service data flow queue in which to insert the enqueued IP packet relative to the plurality of IP packets presently enqueued in the determined service data flow queue; and
enqueue the received IP packet at the identified position in the determined service data flow queue.

3. The computing device of claim 1, wherein the NIC is further to retrieve a third TCP sequence number of the received IP packet, and wherein to identify a position in the service data flow queue in which to insert the enqueued IP packet relative to the plurality of IP packets presently enqueued in the determined service data flow queue, the NIC is to compare the third TCP sequence number of the received IP packet to a respective TCP sequence number of at least a portion of the plurality of IP packets presently enqueued in the determined service data flow queue.

4. The computing device of claim 1, wherein to receive the IP packet, the NIC is to receive the IP packet in a re-assembled and unencrypted condition.

5. The computing device of claim 1, wherein to retrieve the identifying data, the NIC is to retrieve at least one of a source IP address, a destination IP address, a source port number, a destination port number, an application associated with the IP packet, a workflow type of the IP packet, and a protocol associated with the IP packet.

6. The computing device of claim 1, wherein to retrieve the identifying data of the received IP packet, the NIC is to retrieve the identifying data from a header of the received IP packet.

7. The computing device of claim 1, wherein the NIC is further to:
- receive an indication to deliver the IP packet of the plurality of enqueued IP packets to an IP stack managed by the compute engine, wherein the IP packet is enqueued at the head of the service data flow queue;
- determine, in response to having received the indication to deliver the IP packet, whether the service data flow queue is out of sequential order;
- identify, in response to determination that the service data flow queue is out of sequential order, a type of the IP packet;
- determine whether the type of the IP packet corresponds to one or more types of IP packets which can be delivered out of order; and
- deliver, in response to determination that the IP packet corresponds to the one or more types of IP packets which can be delivered out of order, the IP packet to the IP stack.

8. The computing device of claim 7, wherein to identify the type of the IP packet, the NIC is to (i) retrieve identifying data of the IP packet and (ii) identify the type of the second enqueued IP packet based on the retrieved identifying data of the IP packet.

9. The computing device of claim 7, wherein the NIC is further to deliver, in response to determination that the service data flow queue is in sequential order, the IP packet to the IP stack.

10. The computing device of claim 7, wherein the type of the IP packet is a Robust Header Compression (RoHC) feedback packet type.

11. One or more non-transitory machine-readable storage media comprising a plurality of instructions stored thereon that, in response to being executed, cause a network interface controller (NIC) to:
- receive an IP packet;
- retrieve identifying data of the received IP packet;
- identify a TCP data stream associated with the received IP packet based on the retrieved identifying data;
- determine a service data flow queue associated with the TCP data stream;
- determine whether a plurality of IP packets presently enqueued in the determined service data flow queue are out of order by (i) identifying TCP sequence numbers of the plurality of enqueued IP packets and (ii) determining whether any of the identified TCP sequence numbers are missing between a first TCP sequence number of a first enqueued IP packet of the plurality of IP packets at a head of the service data flow queue and a second TCP sequence number of a second enqueued IP packet of the plurality of enqueued IP packets at a tail of the service data flow queue;
- enqueue, as a function of whether the plurality of IP packets presently enqueued in the determined service data flow queue are out of order, the received IP packet at the tail of the determined service data flow queue;
- determine whether an uplink TCP/IP packet is to be retransmitted; and
- enqueue, in response to a determination that the uplink TCP/IP packet is to be retransmitted, the uplink TCP/IP packet at the head of the determined service data flow queue to be transmitted before one or more other packets presently enqueued in the determined service data flow queue.

12. The one or more non-transitory machine-readable storage media of claim 11, wherein the plurality of instructions cause the NIC to:
- identify, in response to determination that the plurality of IP packets presently enqueued in the determined service data flow queue are not out of order, a position in the service data flow queue in which to insert the enqueued IP packet relative to the plurality of IP packets presently enqueued in the determined service data flow queue; and
- enqueue the received IP packet at the identified position in the determined service data flow queue.

13. The one or more non-transitory machine-readable storage media of claim 11, wherein the plurality of instructions cause the NIC to retrieve a third TCP sequence number of the received IP packet, and cause the NIC to, in order to identify a position in the service data flow queue in which to insert the enqueued IP packet relative to the plurality of IP packets presently enqueued in the determined service data flow queue, compare the third TCP sequence number of the received IP packet to a respective TCP sequence number of at least a portion of the plurality of IP packets presently enqueued in the determined service data flow queue.

14. The one or more non-transitory machine-readable storage media of claim 11, wherein the plurality of instructions further cause the NIC to, in order to retrieve the identifying data, retrieve at least one of a source IP address, a destination IP address, a source port number, a destination port number, an application associated with the IP packet, a workflow type of the IP packet, and a protocol associated with the IP packet.

15. The one or more non-transitory machine-readable storage media of claim 11, wherein the plurality of instructions cause the NIC to:
- receive an indication to deliver the IP packet of the plurality of enqueued IP packets to an IP stack managed by a compute engine, wherein the IP packet is enqueued at the head of the service data flow queue;
- determine, in response to having received the indication to deliver the IP packet, whether the service data flow queue is out of sequential order;
- identify, in response to determination that the service data flow queue is out of sequential order, a type of the IP packet;
- determine whether the type of the IP packet corresponds to one or more types of IP packets which can be delivered out of order; and
- deliver, in response to determination that the IP packet corresponds to the one or more types of IP packets which can be delivered out of order, the IP packet to the IP stack.

16. The one or more non-transitory machine-readable storage media of claim 15, wherein the plurality of instructions cause the NIC to, in order to identify the type of the IP packet, (i) retrieve identifying data of the IP packet and (ii) identify the type of the second enqueued IP packet based on the retrieved identifying data of the IP packet.

17. The one or more non-transitory machine-readable storage media of claim 15, wherein the plurality of instructions cause the NIC to deliver, in response to determination that the service data flow queue is in sequential order, the IP packet to the IP stack.

18. A computing device for managing Transmission Control Protocol/Internet Protocol (TCP/IP) packet delivery, the computing device comprising:
- first circuitry to receive an IP packet;
- second circuitry to retrieve identifying data of the received IP packet;

means for identifying a TCP data stream associated with the received IP packet based on the retrieved identifying data;
means for determining a service data flow queue associated with the TCP data stream;
means for determining whether a plurality of IP packets presently enqueued in the determined service data flow queue are out of order by (i) identifying TCP sequence numbers of the plurality of enqueued IP packets and (ii) determining whether any of the identified TCP sequence numbers are missing between a first TCP sequence number of a first enqueued IP packet of the plurality of IP packets at a head of the service data flow queue and a second TCP sequence number of a second enqueued IP packet of the plurality of enqueued IP packets at a tail of the service data flow queue;
third circuitry to enqueue, as a function of whether the plurality of IP packets presently enqueued in the determined service data flow queue are out of order, the received IP packet at a tail of the determined service data flow queue;
fourth circuitry to determine whether an uplink TCP/IP packet is to be retransmitted from the computing device; and
fifth circuitry to enqueue, in response to a determination that the uplink TCP/IP packet is to be retransmitted, the uplink TCP/IP packet at a head of the determined service data flow queue to be transmitted before one or more other packets presently enqueued in the determined service data flow queue to be transmitted before one or more other packets presently enqueued in the determined service data flow queue.

19. The computing device of claim 18, further including:
means for identifying, in response to determination that the plurality of IP packets presently enqueued in the determined service data flow queue are not out of order, a position in the service data flow queue in which to insert the enqueued IP packet relative to the plurality of IP packets presently enqueued in the determined service data flow queue; and
sixth circuitry to enqueue the received IP packet at the identified position in the determined service data flow queue.

20. The computing device of claim 18, further including sixth circuitry to retrieve a third TCP sequence number of the received IP packet, and wherein the means for identifying is further to compare the third TCP sequence number of the received IP packet to a respective TCP sequence number of at least a portion of the plurality of IP packets presently enqueued in the determined service data flow queue.

21. The computing device of claim 18, further including:
sixth circuitry to receive an indication to deliver an IP packet of the plurality of enqueued IP packets to an IP stack managed by a compute engine, wherein the IP packet is enqueued at a head of the service data flow queue;
means for determining, in response to having received the indication to deliver the IP packet, whether the service data flow queue is out of sequential order;
means for identifying, in response to determination that the service data flow queue is out of sequential order, a type of the IP packet;
means for determining whether the type of the IP packet corresponds to one or more types of IP packets which can be delivered out of order; and
seventh circuitry to deliver, in response to determination that the IP packet corresponds to the one or more types of IP packets which can be delivered out of order, the IP packet to the IP stack.

* * * * *